No. 797,281. PATENTED AUG. 15, 1905.
J. G. HENZEL.
FISH HOOK.
APPLICATION FILED FEB. 14, 1905.
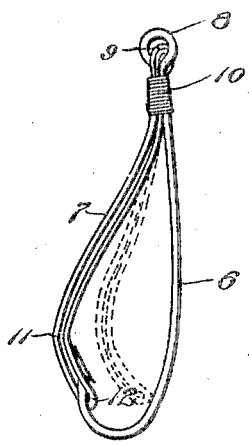

UNITED STATES PATENT OFFICE.

JOHN G. HENZEL, OF CHICAGO, ILLINOIS.

FISH-HOOK.

No. 797,281.          Specification of Letters Patent.          Patented Aug. 15, 1905.

Application filed February 14, 1905. Serial No. 245,566.

*To all whom it may concern:*

Be it known that I, JOHN G. HENZEL, a citizen of the United States, residing at Chicago, in the county of Cook and State of Illinois, have invented new and useful Improvements in Fish-Hooks, of which the following is a specification.

This invention is a weedless fish-hook having means to prevent the hook from catching weeds or other obstructions, such means comprising a spring-loop secured to the shank of the hook and arranged to spring over the point with the bend of the loop engaging under the barb of the hook, so that the point of the hook is covered and weeds and the like will thereby be prevented from catching in the hook.

The accompanying drawing is a perspective view of the invention.

Referring specifically to the drawing, 6 indicates a hook of ordinary construction, to the shank of which is fastened the guard which consists of a loop of spring-wire 7, the free ends of which are secured by being bent around through the eye 8 of the hook, as at 9, and fastened by a wrapping 10 of fine twine, wire, or the like. The loop is offset, as at 11, just above the point of the hook, so as to throw the same laterally beyond the point and the bight of the loop normally fits under the barb of the hook, as at 12, the point of the hook passing in between the side branches of the loop. This guards the point on both sides and on the front, so that it is practically impossible for weeds and the like to catch in the hook. When seized by a fish, the guard yields inwardly, as shown in dotted lines in the drawing, exposing the point and barb of the hook, so that the fish may be caught, and, furthermore, after the fish is hooked the guard acts as a lock to prevent its escape particularly when the fish is hooked through the lip by springing back or out to its normal position, thereby preventing release of the fish.

The guard is preferably made of fine steel wire and is capable of attachment by a fisherman to any ordinary hook.

What I claim as new, and desire to secure by Letters Patent, is—

1. The combination with a fish-hook, of a guard comprising a loop of spring-wire which is secured at its ends to the shank of the hook and engages at its bend under the barb thereof, with its branches extending up on both sides of the point of the hook, to cover the same.

2. The combination with a fish-hook having an eye at the shank, of a guard comprising a loop of spring-wire the ends of which are bent through the eye and secured to the shank by a wrapping, and the bend of which engages under the barb, with its branches extending up both sides of the point, above which they are offset outwardly, as at 11.

In testimony whereof I have signed my name to this specification in the presence of two subscribing witnesses.

JOHN G. HENZEL.

Witnesses:
    WM. J. ROBINSON,
    H. G. BATCHELOR.